United States Patent [19]

Lam et al.

[11] Patent Number: 5,787,116
[45] Date of Patent: Jul. 28, 1998

[54] APPARATUS AND METHOD FOR DETECTING AMPLITUDE MODULATED ANSWER BACK TONED SIGNALS

[75] Inventors: Thanh Lam, Grafton; Timothy Lis, Framingham; Richard Haltmaier, West Newton, all of Mass.

[73] Assignee: Motorola Inc., Schaumburg, Ill.

[21] Appl. No.: 665,624

[22] Filed: Jun. 18, 1996

[51] Int. Cl.$^6$ .................. H04B 1/38; H04L 5/16
[52] U.S. Cl. .................. 375/222; 375/320; 375/340; 375/377; 379/90; 379/93; 379/97; 379/98; 370/292
[58] Field of Search .................. 375/222, 340, 375/224, 320, 377; 379/97, 96, 93, 98; 370/292

[56] References Cited

U.S. PATENT DOCUMENTS

| | | |
|---|---|---|
| 4,931,250 | 6/1990 | Greszczuk .................. 375/8 |
| 5,202,905 | 4/1993 | Sakamoto et al. .................. 375/121 |
| 5,311,578 | 5/1994 | Bremer et al. .................. 379/97 |
| 5,349,635 | 9/1994 | Scott .................. 379/97 |
| 5,446,771 | 8/1995 | Lin .................. 375/224 |

*Primary Examiner*—Stephen Chin
*Assistant Examiner*—Michael W. Maddox
*Attorney, Agent, or Firm*—Nancy R. Gamburd

[57] ABSTRACT

An apparatus and method are provided for a data communications device, such as a modem (100,101), software modem, or facsimile machine, to detect and discriminate various amplitude modulated signals, such as an ANS signal of the ITU V.25 protocol and an ANSam signal of the ITU V.8 protocol. The apparatus and method embodiments first determine the presence of a first frequency component in a received signal, such as the 2100 Hz component of ANS and ANSam signals (205). The received signal is then demodulated (215) and low pass filtered (220), followed by removing any resulting direct current component (225) to form an inclusive signal. A second frequency component, such as the frequency of the 15 Hz amplitude modulating component of an ANSam signal, is removed from the inclusive signal (235), and its resulting magnitude is determined, as a filtered signal magnitude (240). The filtered signal magnitude is subtracted from the magnitude of the inclusive signal (230) to form a discrimination value (245). When the discrimination value is greater than a predetermined threshold, an amplitude modulated signal such as ANSam has been detected (255, 260). When the first frequency component has been detected (205) but when the discrimination value is not greater than a predetermined threshold, a non-amplitude modulated signal (or a signal having amplitude modulation less than a predetermined modulation index), such as ANS, has been detected (255, 265).

30 Claims, 2 Drawing Sheets

APPARATUS AND METHOD FOR DETECTING AMPLITUDE MODULATED ANSWER BACK TONED SIGNALS

FIELD OF THE INVENTION

This invention relates in general to data communications devices, and more specifically, to an apparatus and method for detecting amplitude modulated answer back tone signals.

CROSS-REFERENCE TO RELATED APPLICATION

This application is related to Goodson et al. U.S. Pat. application Ser. No. 08/496,048, entitled "Apparatus and Method for Detecting Amplitude Modulated Signals in the Presence of Impulse Distortions", filed Jun. 28, 1995, incorporated by reference herein, with priority claimed for all commonly disclosed subject matter.

BACKGROUND OF THE INVENTION

Data communications equipment ("DCE"), such as modems and facsimile machines, presently use a signal referred to as an answer back tone ("ANS") to disable any echo suppressers or echo cancellers present on the general (or public) switched telephone network (GSTN). The ANS signal is specified in International Telecommunications Union (ITU) Recommendation V.25 to consist of a 2100 Hertz sine wave with 180 degree phase reversals every 450 msec (+/−25 msec). The ANS signal has been used successfully for many years by both manual and automatic answering DCEs.

Another signal known as an amplitude modulated answer back tone ("ANSam") has recently been specified by ITU Recommendation V.8. This signal is meant both to appear as an ANS signal to the GSTN network and also to identify the answering station as a V.8 capable device. The ANSam signal consists of the ANS signal which is further amplitude modulated ("AM" or "am") by a sine wave at 15 Hertz with a modulation index of 20 percent. Preferrably, the calling DCE should be able to detect the ANSam signal and to distinguish it from an ANS signal at low signal to noise ratios (6 dB SNR), low receive levels (−43 dBm), and other transient variations and distortions generated by network equipment.

A prior art or more classical approach to detecting an ANSam-type signal is to filter the signal with a narrow band filter, rectify the filtered signal to recover the amplitude modulation aspect of the ANSam-type signal, and then apply the filtered and rectified signal to a 15 Hz AM detector. The phase reversals of the ANS and ANSam signals, however, typically appear to the system as impulse distortions (or a superposition of impulse distortions on the signal); such impulse distortions typically cause an impulse response in the system and, for example, causes ringing and overshoot in the filters used to detect the signal, especially because of the narrow bandwidths of the filters needed to detect the signal. This ringing tends to appear to the detector as severe noise, may have a long time constant to return to a normal steady state, and also significantly increases the likelihood of false detection of an ANSam signal.

Another prior art approach to detecting an ANSam-type signal has also employed the filtering and rectification of the ANSam-type signal, but has also attempted to avoid the effects of the impulse distortions by synchronizing to the phase reversals and only detecting the signal between these reversals. This approach of synchronizing to the phase reversals, however, tends to cause discontinuities in the received signal or data and may itself create a step response in the detector, which also reduces noise immunity, increases response time, and increases the likelihood of false detection. Furthermore, this prior art approach does not address the non-periodic transients which may be applied to the system by the network and which may also appear as random impulse distortions.

Another previous approach has been to attempt to detect an ANSam-type signal in the frequency domain by performing a Discrete Fourier Transform (DFT) or by using sharp tone filters. These frequency domain approaches have tended to be considerably more complex, requiring many samples for the DFT, plus windowing to reduce sidebands. In addition, these frequency domain approaches have also tended to be severely impacted by the phase reversals and require a much longer response time due to the narrow bandwidths required to distinguish an ANSam signal from an ANS signal.

Accordingly, a need has remained to reliably detect amplitude modulated signals, such as ANSam signals, to avoid false detections, and to reliably distinguish signals such as ANSam from ANS. In addition, a need has remained to perform such detection efficiently, with minimal complexity and with a minimal response time, and with high noise immunity. Lastly, a need has also remained to perform such ANS and ANSam detection utilizing an apparatus and method which may be embodied in computer software, for example, as a software modem for use by a computer or workstation.

DETAILED DESCRIPTION OF THE INVENTION

Figure 1:
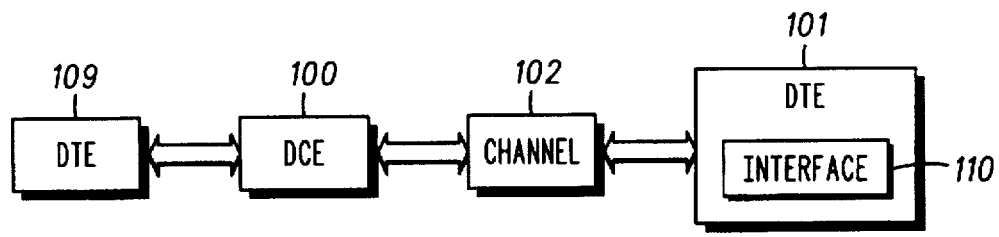
FIG. 1 is a block diagram illustrating data communications equipment connected to each other via a channel, for full duplex data transmission and reception.

FIG. 1 illustrates a first DCE 100, such as a first modem or first facsimile device, coupled to a first data terminal equipment ("DTE") 109, such as a personal computer, a workstation, or other computer or networking terminals or devices. The first DCE 100 is also connected to a second DTE 101, such as a second computer or workstation, via a channel 102, such as the general (or public) switched telephone network ("GSTN"). The second DTE 101 illustrates the preferred embodiment of the present invention, as discussed in greater detail below with reference to FIGS. 2 and 3, in which such data communication equipment is embodied as an interface apparatus 110 and as a software program (such as a software modem) within a computer, such as DTE 101. The modems or other data communications devices and equipment may operate in full-duplex, such that each may transmit data and receive data at the same time. In order to establish a communications link and to compensate for various distortions, impairments, and modifications which may exist in the channel or which may otherwise occur during data transmission, various protocols and standards have evolved, such as the International Telecommunication Union (ITU) Recommendation V.8, V.25, and the recent V.34, involving the use of a variety of signals, such as probe signals, the answer back tone signal, and the amplitude modulated answer back tone signal. Under these various protocols, each of these defined signals has predetermined, defined characteristics, and are transmitted from each DCE (as sender) to the other DCE (as receiver), during the initial communication period (training period) in which the two devices train with each other.

As mentioned above, the ANS signal is the answer back tone signal, defined in ITU Recommendation V.25 as a 2100 Hz sine wave having abrupt, 180 degree phase reversals every 450 milliseconds. The amplitude modulated answer back tone, known as ANSam, also consists of a 2100 Hz sine wave with abrupt, 180 degree phase reversals every 450 milliseconds, which is also amplitude modulated with a 15 Hertz sine wave at a modulation index of 20 percent, as defined by ITU Recommendation V.8. Also as mentioned above, the ANS signal is used to disable any echo suppressors or echo cancellers which may be present in the channel 102 (FIG. 1). The ANSam signal similarly provides these functions, but also utilizes the 15 Hz amplitude modulation ("AM" or "am") to identify the answering or receiving DCE, such as DCE 101 (FIG. 1), as a V.8 capable device. Because the methodology of the present invention may have broader applications beyond ANS and ANSam detection, as used herein, a signal to be modulated, such as the 2100 Hz portion of the ANSam or ANS signals, is referred to as a first frequency component. Also as used herein, the modulating signal, such as the 15 Hz signal, is referred to as a second frequency component or a second frequency envelope component. Also as used herein, an ANS signal is also considered to be an amplitude modulated signal having, however, a zero percent (0%) modulation index.

As discussed in more detail below, the present invention concerns the detection of amplitude modulated signals, such as ANSam, and the distinction of ANSam signals from ANS signals. The various method and apparatus embodiments of the present invention provide a mechanism to both quickly and reliably detect and distinguish (or discriminate) between the ANS and ANSam signals with a high degree of confidence, at low signal to noise ratios, and at low power levels. The invention is very robust, utilizes comparatively low MIPS (millions of instructions per second), and utilizes less complex, lower order filters (rather than the significantly more complicated, higher order filters of the prior art).

Figure 2:
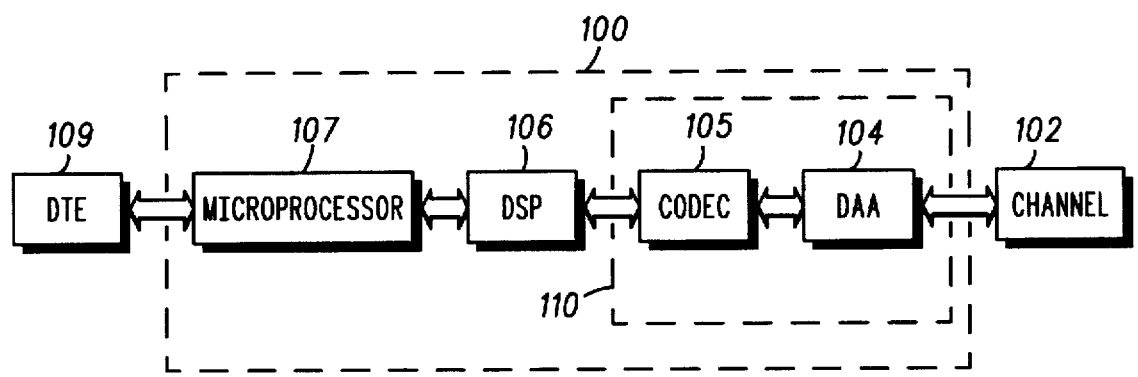
FIG. 2 is a block diagram illustrating an apparatus embodiment in accordance with the present invention.

FIG. 2 is a block diagram illustrating a first embodiment of an apparatus in accordance with the present invention. As shown in FIG. 2, a modem (or other DCE) 100 is coupleable to a DTE 109, such as a computer, and coupleable to a channel 102, for data transmission and reception. Within the DCE (or modem) 100, a channel interface known as a data (or dial) access arrangement ("DAA") 104 may receive an analog signal transmitted on the channel 102. DAAs are known in the prior art and may be made of a variety of discrete components, including analog multiplexers, resistors, capacitors, and operational amplifiers, or may be embodied in whole or part as an integrated circuit, and performs such functions as impedance matching and power level adjustment. Typically connected to the DAA 104 is a codec ("coder-decoder") 105 (also known or referred to as an analog-digital ("A/D") converter), such as an SGS Thompson ST 7544 or ST 7545, which converts an analog signal received from the channel 102 to digital form, and converts digital information to analog form for transmission over the channel 102. The codec 105 is then connected to a digital signal processor ("DSP") 106, such as a Motorola M56002. The DSP is used in a first embodiment of the invention herein, performing the various functions described in detail below with reference to FIG. 3. The DSP 106 is connected to a microprocessor 107, such as a Motorola M68302, which may be coupled to a DTE 109 to transmit and receive digital information.

In an alternative embodiment, one processor, such as a Motorola M68356, performs the functions of and may be utilized in lieu of both the DSP 106 and microprocessor 107 illustrated in FIG. 2. In another and the preferred embodiment, as described in greater detail below, the present invention is embodied as a set of program instructions and utilizes the processor available within a computer or other data terminal equipment, such as a Pentium® class processor, and also performs the functions of and may be utilized in lieu of both the DSP 106 and microprocessor 107 illustrated in FIG. 2. This preferred embodiment also utilizes a DAA (or other channel interface) 104 and a codec 105 (both operating as described above) which are or may be contained within an interface apparatus 110 (which also includes other structures such as a memory and an interface to the computer processor) as described in detail in Sridhar et al. U.S. patent application Ser. No. 08/607,911, entitled "Apparatus and Method for Interfacing Between a Communications Channel and a Processor for Data Transmission and Reception", filed Feb. 28, 1996 (as a continuation-in-part of Ser. No. 08/521,717, filed Aug. 31, 1995), incorporated herein by reference. As a consequence of the interchangeability of a DSP, microprocessor and processor in these various embodiments, the terms DSP, processor (or microprocessor) are used interchangeably and inclusively herein, such that use of one term may be interpreted to mean and include the various other processor embodiments.

Figure 3:
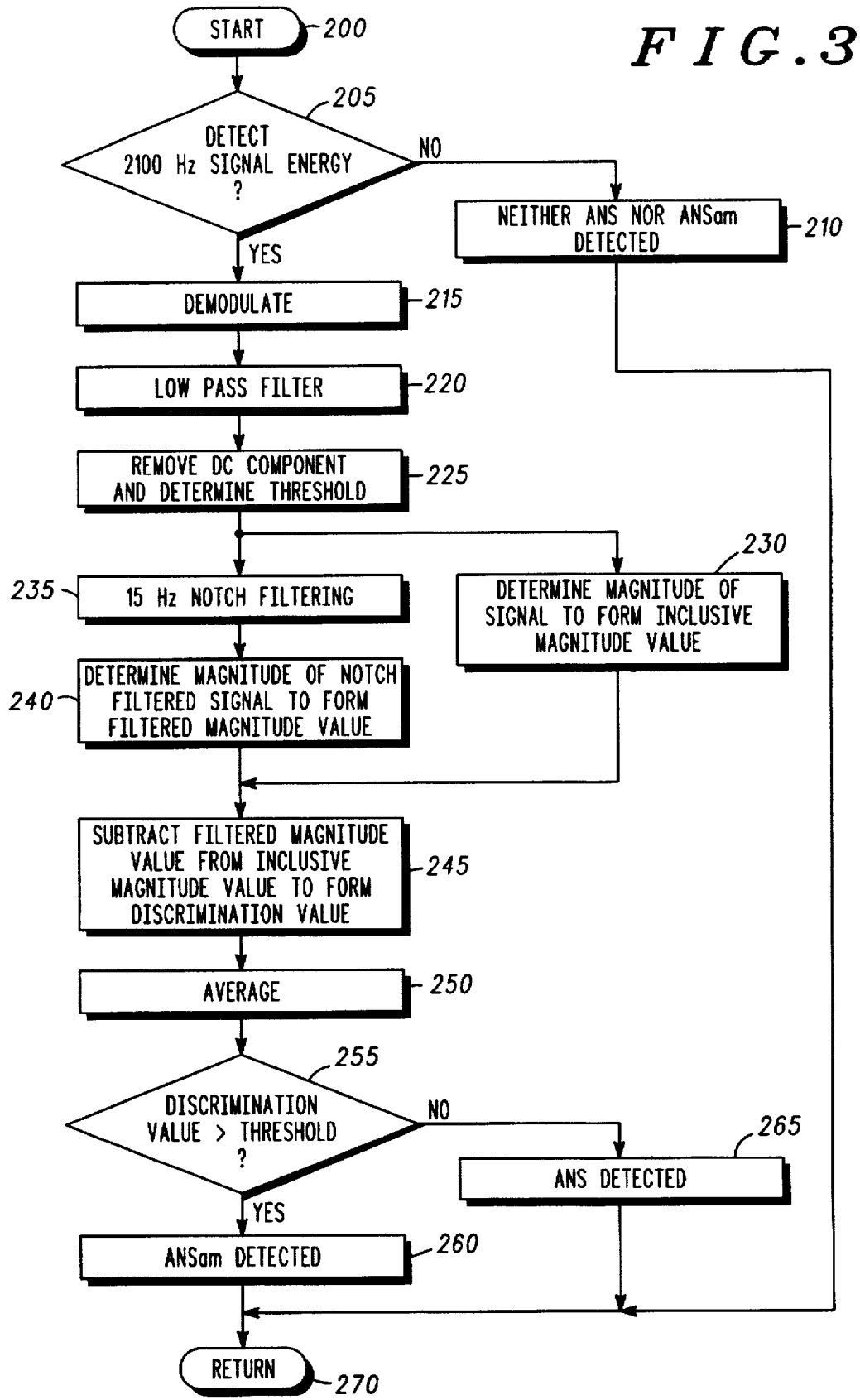
FIG. 3 is a flow diagram illustrating the method embodiment in accordance with the present invention.

FIG. 3 is a flow diagram illustrating the method embodiment in accordance with the present invention. As in the various apparatus embodiments, the method embodiment may be programmed (as a set of program instructions) into a digital signal processor (such as DSP 106, FIG. 2) or another processor (such as a Motorola M68356 processor or a Pentium® processor), and may be utilized within a software modem. Such a set of program instructions, of the preferred embodiment in accordance with the present invention, is contained in Appendix A hereto, and may be compiled for use in a variety of processors or DSPs. Referring to FIG. 3, beginning with start step 200, a received signal is examined to determine whether there is energy (or power) in the vicinity of or frequency band including 2100 Hz, step 205, such as in the vicinity of 2100 +/−25 Hz. Such a determination may be performed utilizing any known method or apparatus, such as an adaptive tone detector, or utilizing the method and apparatus disclosed in the related application specified above, Goodson et al. U.S. patent application Ser. No. 08/496,048, entitled "Apparatus and Method for Detecting Amplitude Modulated Signals in the Presence of Impulse Distortions", filed Jun. 28, 1995, incorporated by reference herein. If there is no (or insufficient) energy in the received signal at or in the spectrum or frequency band in the vicinity of 2100 Hz in step 205, then neither ANS nor ANSam is present, step 210. When there is energy in the received signal at or in the vicinity of 2100 Hz in step 205, indicating the presence of either ANS or ANSam, then in step 215, the received signal is demodulated. In the preferred embodiment, the received signal (e.g., "A") is demodulated by multiplication of the received signal by itself (e.g. (A)(A)), which provides an additional advantage of decreasing the amplitude of impulses which may result from the phase reversals of the ANS and ANSam signals. The demodulated signal is then low pass filtered, step 220, to eliminate aliased components from the demodulation, such as any components in the vicinity of 4200 Hz, resulting in a filtered, baseband signal having components either at zero Hz (i.e., DC (direct current)) (for ANS), or at zero Hz (i.e., DC) and 15 Hz (for ANSam). Next, in step 225, the zero Hz (DC) component is removed, preferrably utilizing a DC tap (a first order filter), to form a signal for subsequent evaluation (referred to as an inclusive signal, to distinguish it from a subsequently filtered signal of steps 235 and 240). Also in step 225, a threshold is determined for subsequent use in detection of the 15 Hz component. For example, the threshold level may be set at a predetermined percentage of the DC component, such as a threshold based upon the percent modulation of the 2100 Hz component by the 15 Hz component in the ANSam signal. In the preferred embodiment, the threshold level is set at 0.00001 (1/100,000 or 0.001%) of the average level of the DC component (as the 15 Hz component to be detected is typically −20 dB to −26 dB from the peak of the 2100 Hz signal).

Continuing to refer to FIG. 3, following step 225, the magnitude of the inclusive signal is determined, as an inclusive signal magnitude (or value), step 230. In the preferred embodiment, the inclusive signal magnitude is determined as the square of the amplitude of the inclusive signal. Also following step 225, in step 235, any 15 Hz component which may be present in the inclusive signal is removed, preferrably utilizing a 15 Hz notch filter, to form a notch filtered signal. The magnitude of the notch filtered signal is then determined, step 240, to form a filtered signal magnitude (or value) (as distinct from the magnitude of the "inclusive" (i.e., non-filtered) signal of step 230). Next, in step 245, the filtered magnitude (or value) (from step 240) is subtracted from the inclusive signal magnitude (from step 230), to form a discrimination value. The discrimination value of step 245 is averaged over a predetermined period of time, step 250. Because the inclusive signal has not been notch filtered, if a 15 Hz component is present in the received signal, it will be reflected in the magnitude of the inclusive signal determined in step 230. Conversely, the magnitude of the notch filtered signal will not reflect or include a 15 Hz component. As a consequence, when a 15 Hz component is present, the subtraction of the notch filtered magnitude from the inclusive signal magnitude, in step 245, will result in a value (referred to as the discrimination value) greater than the previously determined threshold. Conversely, when no 15 Hz component is present, the magnitudes of the inclusive signal and the notch filtered signal will be approximately the same, such that the subtraction step 245 will yield a result (the discrimination value) near zero (or otherwise significantly less than the threshold). Following the averaging step 250, in step 255, when the discrimination value is greater than the threshold (determined in step 225), then an ANSam signal has been detected, step 260. Correspondingly, in step 255, when the discrimination value is not greater than the threshold, then an ANS signal has been detected, step 265, and the method may terminate, return step 270.

In summary, FIGS. 1 through 3 disclose a software modem or other device for data transmission and reception, the software modem stored as a set of program instructions on a computer readable medium, the software modem utilizable in conjunction with a computer (or other DTE 101) for detecting an amplitude modulated signal, the amplitude modulated signal having a first frequency component, and the amplitude modulated signal transmitted and received via a channel 102 to form a received signal. The software modem then comprises: means for determining a presence of the first frequency component in the received signal (step 205); when the first frequency component is present, means for demodulating the received signal to form a demodulated signal (step 215); means for removing a direct current component from the demodulated signal to form an inclusive signal (step 225); means for determining a magnitude of the inclusive signal to form an inclusive signal magnitude (step 230); means for removing a second frequency component of the inclusive signal to form a filtered signal (step 235); means for determining a magnitude of the filtered signal to form a filtered signal magnitude (step 240); means for forming a discrimination value as a difference between the inclusive signal magnitude and the filtered signal magnitude (step 245); and when the discrimination value is greater than a predetermined threshold, means for detecting a presence of the amplitude modulated signal (steps 255 and 260). In addition, the software modem may also include, when the discrimination value is not greater than a predetermined threshold, means for detecting a presence of a signal having the first frequency component which is not amplitude modulated by the second frequency component by more than a predetermined index (step 265).

A major and significant advantage of a data communication device, hardware modem, or software modem, with such ANS and ANSam detection in accordance with the present invention, is the reduced effects of impulse responses. Prior art methods and apparatus typically have only been able to detect and discriminate an ANSam signal at a minimum of −30 dBm and at a signal to noise ratio of 20 dB. In the prior art, the phase reversals of the ANS and ANSam signals tend to cause severe impulses to a 15 Hz band pass filter or detector, which would then resonate due to the narrow bandwidths required for proper detection, causing false positive detections of a non-existent ANSam signal. The present invention also provides superior detection and discrimination of the 15 Hz component of the incoming signal, which is typically difficult to detect and discriminate in the prior art due to impulse distortions occurring with a frequency of the same order of magnitude as the settling time of most narrow band, 15 Hz band pass filters.

Another significant advantage of the present invention is its applicability to a wide range of technologies and circumstances involving the occurrence of impulse distortions, in addition to the detection of ANS and ANSam signals. For example, various cable environments, such as cable television environments, are subject to significant impulse noise from switching and static. Impulse noise in any communication channel is also caused in the environment generally, and may also occur from such local activities as automobile ignition and microwave generation.

Other significant advantages of the present invention may also be apparent. The present invention is very reliable, with negligible false positive detections, and is very robust. In addition, the present invention requires comparatively few MIPS, is able to use lower order digital filters, and may be implemented in a manner which requires comparatively little memory and which utilizes comparatively little processing time. As a consequence, the present invention provides significantly improved response time, superior noise rejection, and superior discrimination of amplitude modulated signals subject to impulse distortions, such as ANS and ANSam signals.

Yet another significant advantage of the present invention is its preferred embodiment within a software modem, utilizing the processing capabilities available within many computers, without requiring the additional processors and DSPs of prior art modems and other DCEs.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

APPENDIX A

```
SC_DSP_AutoRxANSamDetect()
{
  for(i=0; i<SC_SAMPLE_PER_T; ++i)
  {
    SC_DSP_AutoRx2100Demod();
    SC_DSP_AutoRxLowPass();
    SC_DSP_AutoRxDCTap();
    SC_DSP_AutoRxNotch15();
    SC_DSP_AutoRxAverageEnergy();
    SC_DSP_AutoRxANSamDecision();
  }
}
SC_DSP_AutoRx2100Demod()
{
  /* Demodulate to base band with itself and squared amplitude factor */
  Signal(i) = iagc*iagc*(signalIn(i)*SignalIn(i));
}
SC_DSP_AutoRxLowPass()
/* Low Pass Filter to remove aliased signal and channel noise */
/* Use second order Butterworth Lowpass Filter, cutoff freq = 20 Hz */
  b = .5*[.0000752 .0001504 .0000752];
  a = .5*[1 -1.9753 .9756];
}
SC_DSP_AutoRxDCTap()
{
  /* DC Tap to Remove DC Offset */
  DC_avg = DC_avg + Signal(i);
  DC_avg = DC_avg/480; /* To Remove DC Offset */
  Threshold = DC_avg*.025; /* Threshold of ANSam Detection */
  Pass(i) = Signal(i) - DC_avg; /* Signal After removal of DC */
}
SC_DSP_AutoRxNotch15()
{
  /* 2nd Order 15 Hz Notch Filter Coefficients */
  b = .5*[1 -1.9998 1]; /* Numerator */
  a = .5*[1 -1.5999 .6400]; /* Denominator */
  Notch(i) is the output of the filter.
}
SC_DSP_AutoRxAverageEnergy()
{
  /* Averaging */
  Ratio = .998*Ratio + .002*(Pass(i)*Pass(i) - Notch(i)*Notch(i));
SC_DSP_AutoRxANSamDecision()
{
  /* ANSam Decision */
  if(cntr == 1000) {
    Test = Ratio;
    if(Test > Threshold)
      "ANSam detected"
    else
      "ANS detected"
  }
}
```

We claim:

1. A method for detecting an amplitude modulated signal, the amplitude modulated signal having a first frequency component, the amplitude modulated signal transmitted and received via a channel to form a received signal, the method comprising:

(a) determining a presence of the first frequency component in the received signal;

(b) when the first frequency component is present, demodulating the received signal to form a demodulated signal;

(c) removing a direct current component from the demodulated signal to form an inclusive signal;

(d) determining a magnitude of the inclusive signal to form an inclusive signal magnitude;

(e) removing a second frequency component of the inclusive signal to form a filtered signal;

(f) determining a magnitude of the filtered signal to form a filtered signal magnitude;

(g) forming a discrimination value as a difference between the inclusive signal magnitude and the filtered signal magnitude; and (h) when the discrimination value is greater than a predetermined threshold, detecting a presence of the amplitude modulated signal.

2. The method of claim 1, further comprising:

(i) when the discrimination value is not greater than a predetermined threshold, detecting an absence of the amplitude modulated signal.

3. The method of claim 1, further comprising:

(i) when the discrimination value is not greater than a predetermined threshold, detecting a presence of a signal having the first frequency component which is not amplitude modulated by the second frequency component by more than a predetermined index.

4. The method of claim 1, wherein step (b) further comprises:

(b1) low pass filtering the demodulated signal.

5. The method of claim 1, wherein step (b) further comprises:

(b1) demodulating the received signal by multiplying the received signal by the received signal.

6. The method of claim 1, wherein step (a) further comprises:

(a1) when the first frequency component is not present, detecting an absence of the amplitude modulated signal.

7. The method of claim 1, wherein step (e) further comprises:

(e1) notch filtering the inclusive signal at the second frequency component to form the filtered signal.

8. The method of claim 1, wherein step (g) further comprises:

(g1) averaging the difference between the inclusive signal magnitude and the filtered signal magnitude over a predetermined period of time to form the discrimination value.

9. The method of claim 1 wherein the amplitude modulated signal is an ANSam signal.

10. The method of claim 1 wherein the first frequency component is 2100 Hz and the second frequency component is 15 Hz.

11. An apparatus for data transmission and reception, the apparatus having an initial training period for detecting an amplitude modulated signal, the amplitude modulated signal having a first frequency component, the amplitude modulated signal transmitted via a channel, the apparatus comprising:

a data access arrangement coupleable to the channel to receive a signal to form a received signal;

a codec coupled to the data access arrangement to sample the signal, to form a sampled received signal; and a processor coupled to the codec to receive the sampled received signal, the processor responsive through a set of program instructions to determine a presence of the first frequency component in the sampled received signal; when the first frequency component is present, the processor further responsive to demodulate the sampled received signal to form a demodulated signal, to remove a direct current component from the demodulated signal to form an inclusive signal, to determine a magnitude of the inclusive signal to form an inclusive signal magnitude, to remove a second frequency component of the inclusive signal to form a filtered signal, to determine a magnitude of the filtered signal to form a filtered signal magnitude, to form a discrimination value as a difference between the inclusive signal magnitude and the filtered signal magnitude, and when the discrimination value is greater than a predetermined threshold, to determine a presence of the amplitude modulated signal.

12. The apparatus of claim 11 wherein the processor is further responsive, when the discrimination value is not greater than a predetermined threshold, to determine an absence of the amplitude modulated signal.

13. The apparatus of claim 11 wherein the processor is further responsive, when the discrimination value is not greater than a predetermined threshold, to determine a presence of a signal having the first frequency component which is not amplitude modulated by the second frequency component by more than a predetermined index.

14. The apparatus of claim 11 wherein the processor is further responsive to low pass filter the demodulated signal.

15. The apparatus of claim 11 wherein the processor is further responsive to demodulate the sampled received signal by multiplying the sampled received signal by the sampled received signal.

16. The apparatus of claim 11 wherein the processor is further responsive, when the first frequency component is not present, to determine an absence of the amplitude modulated signal.

17. The apparatus of claim 11 wherein the processor is further responsive to notch filter the inclusive signal at the second frequency component to form the filtered signal.

18. The apparatus of claim 11 wherein the processor is further responsive to average the difference between the inclusive signal magnitude and the filtered signal magnitude over predetermined period of time to form the discrimination value.

19. The apparatus of claim 11 wherein the amplitude modulated signal is an ANSam signal.

20. The apparatus of claim 11 wherein the first frequency component is 2100 Hz and the second frequency component is 15 Hz.

21. A software modem for data transmission and reception, the software modem stored as a set of program instructions on a computer readable medium, the software modem utilizable in conjunction with a computer for detecting an amplitude modulated signal, the amplitude modulated signal having a first frequency component, the amplitude modulated signal transmitted and received via a channel to form a received signal, the software modem comprising:

means for determining a presence of the first frequency component in the received signal;

when the first frequency component is present, means for demodulating the received signal to form a demodulated signal;

means for removing a direct current component from the demodulated signal to form an inclusive signal;

means for determining a magnitude of the inclusive signal to form an inclusive signal magnitude;

means for removing a second frequency component of the inclusive signal to form a filtered signal;

means for determining a magnitude of the filtered signal to form a filtered signal magnitude;

means for forming a discrimination value as a difference between the inclusive signal magnitude and the filtered signal magnitude; and when the discrimination value is greater than a predetermined threshold, means for detecting a presence of the amplitude modulated signal.

22. The software modem of claim 21, further comprising:

when the discrimination value is not greater than a predetermined threshold, means for detecting an absence of the amplitude modulated signal.

23. The software modem of claim 21, further comprising:

when the discrimination value is not greater than a predetermined threshold, means for detecting a presence of a signal having the first frequency component which is not amplitude modulated by the second frequency component by more than a predetermined index.

24. The software modem of claim 21, further comprising:

means for low pass filtering the demodulated signal.

25. The software modem of claim 21, further comprising:

means for demodulating the received signal by multiplying the received signal by the received signal.

26. The software modem of claim 21, further comprising:

when the first frequency component is not present, means for detecting an absence of the amplitude modulated signal.

27. The software modem of claim 21, further comprising:

means for notch filtering the inclusive signal at the second frequency component to form the filtered signal.

28. The software modem of claim 21, further comprising:

means for averaging the difference between the inclusive signal magnitude and the filtered signal magnitude over predetermined period of time to form the discrimination value.

29. The software modem of claim 21 wherein the amplitude modulated signal is an ANSam signal.

30. The software modem of claim 21 wherein the first frequency component is 2100 Hz and the second frequency component is 15 Hz.

* * * * *

UNITED STATES PATENT AND TRADEMARK OFFICE
CERTIFICATE OF CORRECTION

PATENT NO. : 5,787,116
DATED : July 28, 1998
INVENTOR(S) : Thanh Lam, Timothy Lis, Richard Haltmaier It is certified that error appears in the above-identified patent and that said Letters Patent is hereby corrected as shown below:

Title,
Delete "TONED" and substitute -- TONE --

Signed and Sealed this

Second Day of October, 2001

Attest:

*Attesting Officer*

NICHOLAS P. GODICI
*Acting Director of the United States Patent and Trademark Office*